Jan. 12, 1943.   G. W. ASHLOCK, JR   2,308,038
FRUIT ORIENTING DEVICE
Filed Nov. 3, 1941
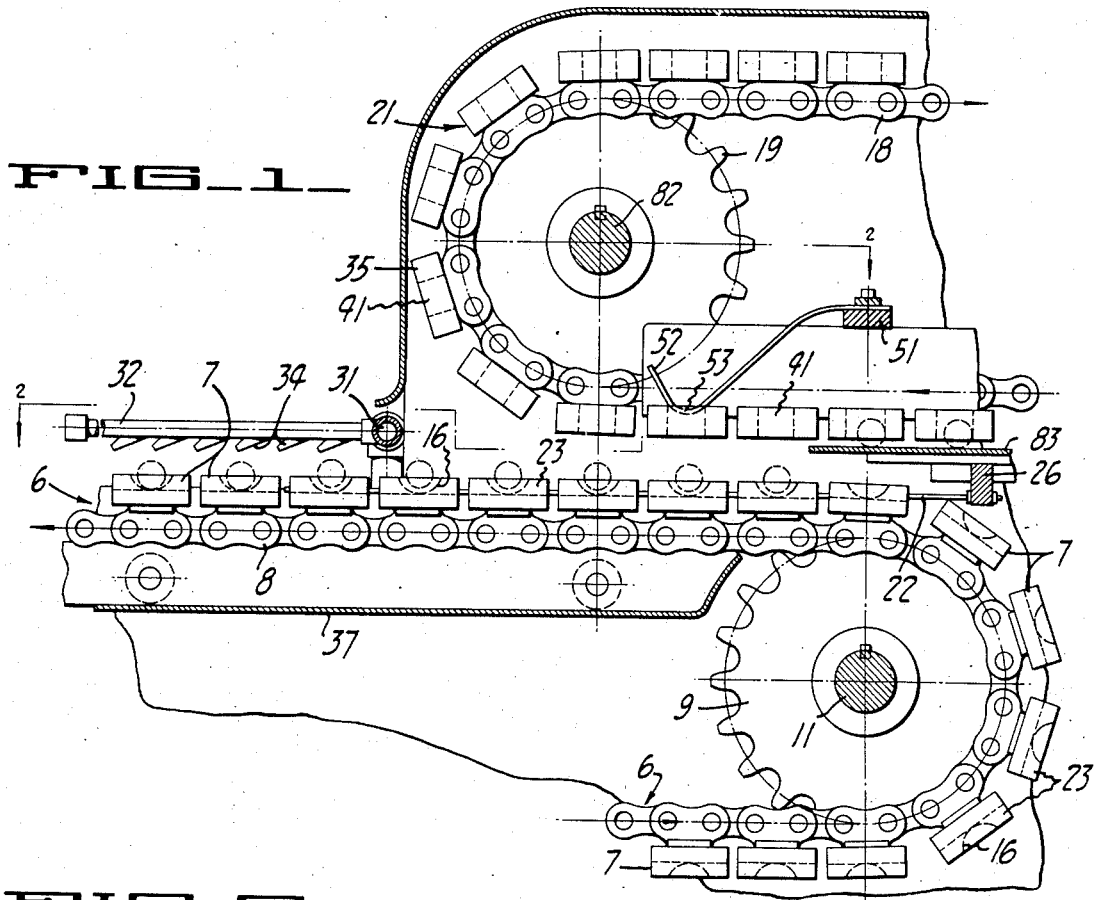
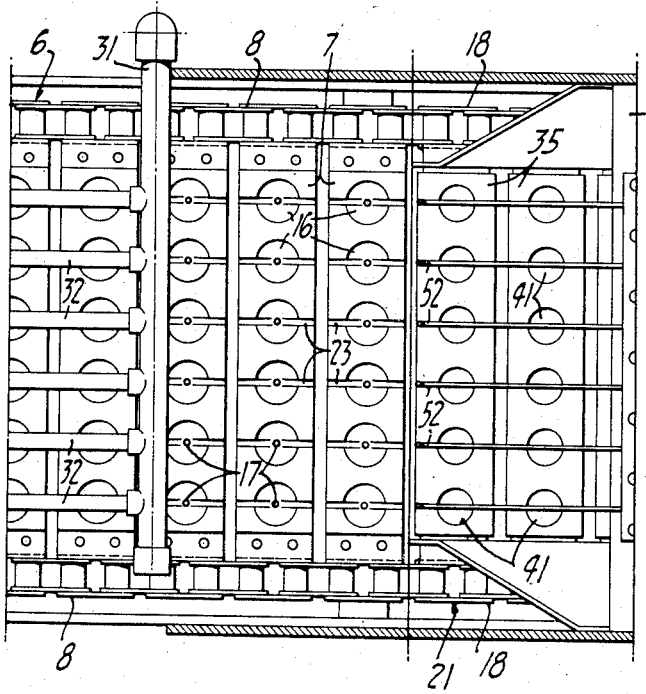
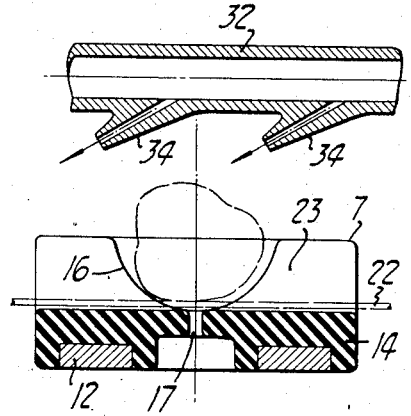
INVENTOR
George W. Ashlock Jr.
BY Robert H. Eckhoff
ATTORNEY

UNITED STATES PATENT OFFICE 2,308,038

FRUIT ORIENTING DEVICE

George W. Ashlock, Jr., Oakland, Calif.

Application November 3, 1941, Serial No. 417,713

10 Claims. (Cl. 198—33)

This invention relates to the orienting of generally spherical objects having an indent at one end thereof such as cherries, peaches, plums, apricots, tomatoes and the like. Such objects have been oriented heretofore in such machines as are disclosed in my Patent 2,212,892 and 2,213,893 issued respectively August 27, 1940, and September 3, 1940. In such machines the object is oriented in a receptacle in which the object is moved by an orientation member moved relative to the receptacle. Fruits such as cherries are usually handled after being cooked or otherwise processed. They are usually not fresh but instead may be covered with a brine or processing solution and may even be quite hot. Usually only a few seconds are available for orientation. I have found that by maintaining the object undergoing orientation wet with a lubricant the time required for orientation can be decreased while the percentage of articles successfully oriented is increased. In addition, and this is quite important, the orientation of irregularly shaped objects is hastened and made more certain.

Extended tests of the machine of the present invention show that it is effective to straighten 90% or more of the fruit delivered to it even though the fruit is so irregular in shape that without the means of the present invention only about one-half the fruit could be successfully oriented.

The invention includes other objects and features of advantage, some of which, together with the foregoing, will appear hereinafter wherein the present preferred embodiment of the invention is disclosed.

In the drawing accompanying and forming a part hereof

Figure 1 is a side elevation, partly in section, through a machine embodying the preferred form of machine of the present invention.

Figure 2 is a section on line 2—2 of Figure 1.

Figure 3 is a diagrammatic view illustrating the operation of an orientation section of a machine embodying the present invention.

As appears in Figure 1, I provide a fruit receiving conveyor indicated generally at 6; the straightening or article orientation is effected on this conveyor. The orientation conveyor is suitably made up after the manner of conveyor 10 as disclosed in my United States Patent Number 2,157,518 as of May 9, 1939. As appears in said patent, a plurality of fruit holders, identified herein as 7 are positioned between oppositely provided conveyor chains 8 extending over sprockets 9 on shaft 11. Each fruit holder is made up of a metal strip 12 having integrally bonded thereto a suitably apertured rubber facing sheet 14 as is disclosed in my Patent Number 2,209,305 issued July 30, 1940. This sheet includes one or more receptacles 16, each preferably having an inner concave surface providing a hemispherical cavity or pocket. When a pitting knife is employed a centrally positioned aperture 17 extends through each receptacle to pass the pit.

The conveyor 6 usually moves toward a suitable working or fruit handling mechanism, such as a pitting machine or to some other suitable machines for cutting, peeling, trimming, stoning, halving, quartering, or performing any other suitable operation. The conveyor 6 is suitably fed with articles to be handled but I prefer to provide as a feeding device a second conveyor indicated generally at 21 and carrying articles toward conveyor 6, and depositing them on conveyor 6 generally after the manner disclosed in my United States Patent Number 2,190,970 of February 20, 1940. The relation between the two conveyors and the cooperation between them will be further discussed hereinafter in detail.

In accordance with this invention, means are provided for turning an article in each holder to position the article in a selected position. In accordance with this invention, I provide a rod member indicated generally at 22 extending through slot 23 formed in each fruit holder. This rod member is preferably mounted from a support indicated at 26 in the frame of the machine, and is so positioned that, as the conveyor advances over its path, the rod is positioned adjacent the bottom of the slot 23 and the receptacle in each fruit holder. Usually a length of about one foot suffices for each rod, this length being measured after the fruit or vegetables have been positioned in a haphazard position on conveyor 6 and in the carrier receptacles therein.

As suitable rod members I have employed lengths of string, wire, rubber strips, wooden rods, woven metal members, and roughened glass rods; these were round, rectangular, or polygonal in cross-section. The essential thing to operation is the relative movement between the rod and the fruit holder and the rotation of the fruit thereby obtained.

As is disclosed in my aforementioned patents, the rod member 22 is rotated, oscillated or vibrated. As is also disclosed in the aforesaid patents, the rod member extends in the direction of advance of the conveyor or transverse thereto in which case it is carried by each fruit holder The showing made herein is merely typical and any one of the several receptacle-rod constructions of my patents is useful instead. The present invention is not restricted in applicability to the orientation means disclosed and one can employ successfully that orientation construction shown and described in my application Serial No. 395,670 filed May 28, 1941.

The feed conveyor includes a pair of spaced conveyor chains 18 extended over sprockets 19 on shaft 20. Between the chains are extended rubber covered strip members 35 (see strips 37 in my patent 2,190,970) apertured as at 41 to receive cherries, or other articles, and move them along skid plate 83 as the bottom conveyor run advances to the left in Figure 1 until finally the articles drop off the end of the skid plate into a receptacle in the orientation conveyor. The movement of the two conveyors is such that a receptacle 16 in the orientation conveyor is in position to receive an article dropping from the feed conveyor and released by the skid plate.

As appears in Figure 3, the fruit deposited in the receptacle may have such an irregular shape that it does not engage the rod even though dropped with some force. In accordance with this invention I mount upon the machine a suitable manifold 31 having extending therefrom, over each line of receptacles and in the direction of advance of the orientation conveyor, a plurality of distributing pipes 32. On the under side of each pipe, as appears in Figure 3, are positioned a plurality of nozzles 34 extending in the direction of advance and adapted to discharge a fine jet-like fluid stream down upon an article, as appears diagrammatically in Figure 3. The force of the fluid ejected through each nozzle 34 is such that it is effective to move an unstably positioned article and displace it to such an extent that the article will engage the rod and, because of the relative movement between the rod and the carrier, be moved thereby finally into a position with the dimple in the fruit downwardly. A plurality of jets ensure that each article will be finally correctly positioned. The jets are spaced from the point of deposit of the articles on the orientation conveyor a distance sufficient to permit orientation to be effected by the orienting member cooperating with the receptacle or holder.

Any suitable fluid can be empoyed and I have successfully used air, although this is relatively expensive. I have also used wet steam, or lubricating liquids as water, or other liquids as presently disclosed herein. In the case of a liquid, a pan 37 is placed beneath the conveyor to collect the fluid and permit its return to a suitable source for ejection through the manifold, pipes and jets.

In accordance with this invention the fluid is preferably ejected onto the article undergoing straightening with such force that the ejected fluid is effected to move the article unless the article is stably positioned, in the case of a cherry, with the dimple end down. If the fluid is a liquid as water or other lubricant, it floods the receptacle and is effective to wet the surface thereof so that the article can be quickly and easily turned into position by the relative movement between the receptacle and the orientation member. If desired, the fluid used for turning the fruit can be air, a treatment solution, water, wet steam, or other suitable fluid.

Selection of the fluid depends in part on the subsequent use to which the articles are to be put. For example, soapy water is a good lubricant for cherries but the cherries must be thoroughly washed before consumption to ensure freedom from a soap taste. An emulsion of a petroleum white oil can also be employed, the so-called liquid petrolatum, as can an emulsion of natural vegetable oils. In general, any material lowering the resistance between the article and the aperture material can be employed so long as it does not harm the article, the machine, and is not harmful to humans if the article is intended for human consumption. In place of soapy water I have used water containing various wetting agents such as various sulfated and sulfonated organic compounds, particularly fatty acids and their alcohols such as sodium lauryl sulfate and the like. A list of these wetting agents is given in the January issues of "Industrial and Engineering Chemistry" for 1939 and 1941 and in Bulletin E 504, June, 1940, of the Division of Insecticide Investigations of the Department of Agriculture. The use of these is of advantage on brined cherries because of the high relative hardness of the brine in which the cherries are treated.

The use of these lubricants cuts the orientation time to a fraction of that required when the lubricant is not applied. Further, and this is even more important, oriented articles remain oriented even though the orientation member continues to move while in contact with them.

This application contains subject matter taken from my application Serial Number 358,654 filed September 27, 1940, now Patent Number 2,288,062, June 30, 1942, as well as from my application Serial Number 395,670 filed May 28, 1941, now Patent Number 2,296,490, September 22, 1942.

I claim:

1. A machine for positioning a generally spherical article having at least one face thereon capable of resting stably on a flat surface, said machine comprising an article holder for restraining horizontal movement of the article, a member extending across the holder adjacent the bottom thereof in a cooperative relation to engage an unstably supported article in said receptacle, means for moving said receptacle relative to said member to move said article and position said article with said face substantially horizontal, and means for maintaining said article wet with a lubricant during movement of said article by said moving means.

2. A machine as in claim 1 wherein the article is maintained wet with soapy water.

3. A machine as in claim 1 wherein the article is maintained wet with an oil-water emulsion.

4. A machine as in claim 1 wherein the article is maintained wet with water containing a sulfated fatty acid material.

5. In a machine for positioning a generally spherical object having at least one face thereon capable of resting stably on a flat surface, a receptacle for supporting an article positioned therein, an elongated member positioned adjacent the bottom of said receptacle and normally engaging an unstably supported object in said receptacle, means for moving the receptacle relative to the member to move an object engaged by said member into a position wherein the object is stably positioned with said face horizontal, and means for forcefully ejecting a liquid through a jet onto said receptacle and an object therein with a force sufficient to assist in turning said object in said receptacle during relative movement between said receptacle and said member.

6. In a machine for positioning a generally spherical object having at least one face thereon capable of resting stably on a flat surface, a receptacle for supporting an article positioned therein, an elongated member positioned adjacent the bottom of said receptacle and normally engaging an unstably supported object in said receptacle, means for moving the receptacle relative to the member to move an object engaged by said member into a position wherein the object is stably positioned with said face horizontal, and means for maintaining said receptacle flooded with a liquid during relative movement between said receptacle and said member.

7. In a machine for positioning a generally spherical object having at least one face thereon capable of resting stably on a flat surface, a receptacle for supporting an article positioned therein, said receptacle being movable substantially continuously over a path, an elongated member positioned adjacent the bottom of said receptacle and normally engaging an unstably supported object in said receptacle, means for moving the receptacle relative to the member to move an object engaged by said member into a position wherein the object is stably positioned with said face horizontal, and means for ejecting a fluid at a plurality of spaced points along said path onto an object positioned in said receptacle during relative movement between said receptacle and said member.

8. In a machine for positioning a generally spherical object having at least one face thereon capable of resting stably on a flat surface, a receptacle for supporting an article positioned therein, said receptacle being movable substantially continuously over a path, an elongated member positioned adjacent the bottom of said receptacle and normally engaging an unstably supported object in said receptacle, means for moving the receptacle relative to the member to move an object engaged by said member into a position wherein the object is stably positioned with said face horizontal, and a conduit extending in the direction of said path and having a plurality of jets for ejecting a fluid onto an object positioned in said receptacle during relative movement between said receptacle and said member.

9. In a device for orienting fruit, a conveyor having a series of fruit holding receptacles wherein fruit is oriented, means for moving said conveyor through an orienting station whereat the fruit is oriented, a member cooperating with a receptacle at said orienting station to orient a fruit in said receptacle in a predetermined position, and means for maintaining said receptacle, said fruit and said member wet with a lubricant during orientation of said fruit at said station.

10. A device as in claim 9 wherein the lubricant is ejected forcefully as a jet at the orientation station to assist orientation.

GEORGE W. ASHLOCK, Jr.